F. H. HALL.
MANUFACTURE OF REINFORCED INNER TUBES OF PNEUMATIC TIRES.
APPLICATION FILED MAY 24, 1912.
1,094,325.
Patented Apr. 21, 1914.
2 SHEETS—SHEET 1.
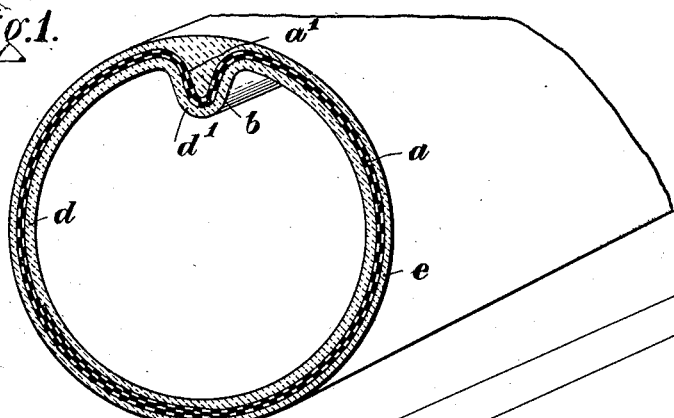
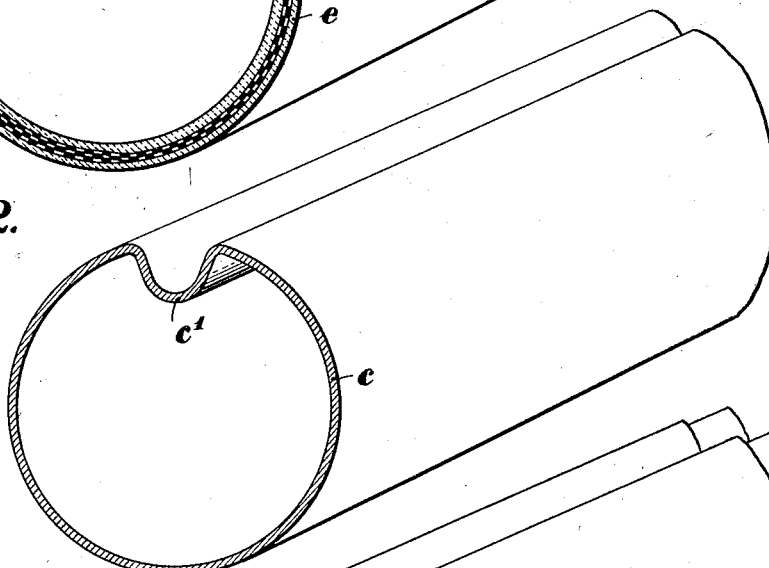
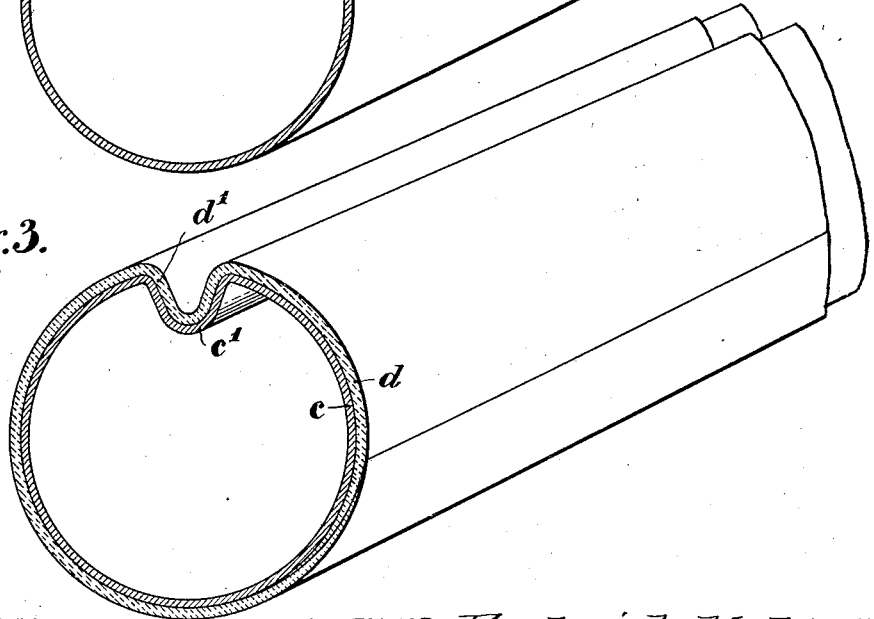
WITNESSES
INVENTOR Frederick H. Hall
by James L. Norris Jr.
Atty.

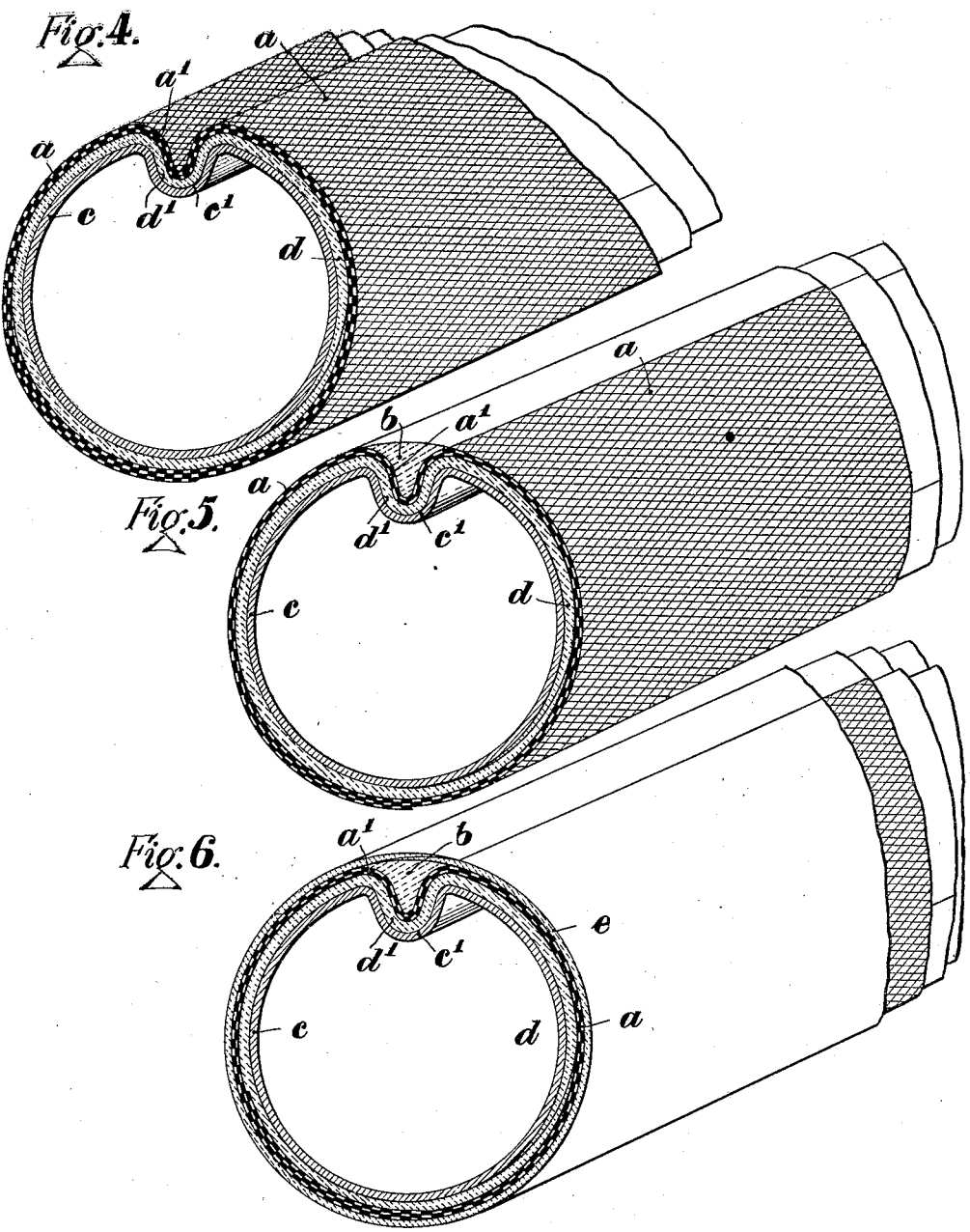

UNITED STATES PATENT OFFICE.

FREDRICK HAROLD HALL, OF NORTON LINDSEY, ENGLAND.

MANUFACTURE OF REINFORCED INNER TUBES OF PNEUMATIC TIRES.

1,094,325.

Specification of Letters Patent.  Patented Apr. 21, 1914.

Application filed May 24, 1912. Serial No. 699,439.

*To all whom it may concern:*

Be it known that I, FREDRICK HAROLD HALL, subject of the King of Great Britain, residing at Gannaway Gate, Norton Lindsey, Warwickshire, England, have invented certain new and useful Improvements Relating to the Manufacture of Reinforced Inner Tubes of Pneumatic Tires, of which the following is a specification.

This invention relates to the manufacture or production of reinforced inner tubes for pneumatic tires, said tubes being of the kind comprising, in combination with the rubber walls, a continuous encircling band of fabric of greater circumferential length than the normal circumference of the said tube (when deflated) and plaited or undulated at one or more points to form longitudinal folds which are each contained within or filled up by a separate reëntrant ridge or thickened part of rubber; the said folds or plaits allowing of the expansion of the tube, when inflated, until a given limit is reached, when the fabric acts as a check for preventing over expansion.

According to the present invention the manufacture of the tube is carried out upon a mandrel having a longitudinal groove or grooves corresponding to the reëntrant or thickened parts of the tube which contain the plaits, the inner layers or plies of rubber and fabric being made to conform to the shape of the mandrel and depressed into the grooves to form the plaits, and the latter then filled with rubber and the outer layer or layers of rubber applied.

Figure 1 of the accompanying drawings represents a section through the reinforced tube. Fig. 2 is a section through the grooved mandrel upon which the tube is manufactured according to this invention. Fig. 3 illustrates the first rubber layer applied around the mandrel, showing how it is pressed into the groove. Fig. 4 represents the plaited canvas band wrapped around the inner rubber layer and pressed into the groove of the mandrel. Fig. 5 shows the next step in the process of manufacture, the plaited portion of the fabric being filled in with rubber. Fig. 6 is a view showing the outer layer of rubber applied, and the tube built-up ready for baking.

The same letters of reference indicate corresponding parts in each of the figures of the drawings.

The reinforced tube represented in Fig. 1 comprises a continuous band $a$ of canvas or other fabric embedded within the rubber walls, as shown, and passing completely around the tube. To allow of the necessary expansion the band $a$ is made of greater transverse circumferential length than that of the deflated tube and at the tread portion the excess length is folded longitudinally into a deep plait $a^1$, which is embedded within or filled-up and surrounded by a longitudinal rib or thickened part $b$ of rubber. When the tube is inflated the rubber walls expand, and the plait $a^1$ of the band $a$ extends or pays itself out with the walls until the said band attains the shape of a complete circle, when it acts as a positive check for preventing over distension of the tube. In carrying out the manufacture of the said tube, an aluminium or other mandrel $c$ is employed, as shown in Fig. 2, having a longitudinal groove or channel $c^1$ sunken in its periphery. A length of uncured sheet rubber is taken and is wrapped around the mandrel as represented at $d$, Fig. 3, the portion $d^1$ of same being pressed into, and made to conform to the shape of, the groove $c^1$, and the edges overlapping as shown. Next the canvas band $a$ is wrapped a number of times around, as shown in Fig. 4, being depressed into the sunken part $d^1$ of the rubber sheet $d$ to form the plait $a^1$. This plait is then filled in with uncured rubber, as at $b$, Fig. 5, so as to complete the circular external contour of the tube, and the outer wrapping or ply of uncured sheet rubber $e$ is applied, as represented in Fig. 6, the edges overlapping. The whole is tightly bound around with tape, and placed in a suitable stove or oven, where the tube is baked, and the rubber cured, converting the said rubber into a homogeneous mass without joints or seams and within which the canvas band is embedded, as in Fig. 1. The mandrel is removed, and the ends of the tube joined up in the ordinary manner.

For making tubes having two or more reëntrant plaited parts, the mandrel would have a similar number of corresponding grooves.

Having fully described my invention, what I desire to claim and secure by Letters Patent is:—

The method of making reinforced inner tubes for pneumatic tires which consists in wrapping a sheet of uncured rubber around a longitudinally-grooved mandrel of the cross-sectional shape of the inside of the tube and pressing said sheet into the groove in said mandrel and against the walls thereof; wrapping a band of fabric around the previously-wrapped mandrel and pressing the same into said groove and against the portion of the sheet therein; filling the plait thus formed in said sheet and band with uncured rubber; wrapping an outer sheet of rubber around said fabric and plait, to complete the circular external contour of the tube; and finally vulcanizing the completed tube.

In testimony whereof I have hereunto set my hand in presence of two subscribing witnesses.

FREDRICK HAROLD HALL.

Witnesses:
HENRY NORTON SKERRETT,
WILLIAM STAIKES SKERRETT.

Copies of this patent may be obtained for five cents each, by addressing the "Commissioner of Patents, Washington, D. C."